United States Patent [19]

McGee

[11] Patent Number: 4,969,739
[45] Date of Patent: Nov. 13, 1990

[54] SPECTROMETER WITH DIRECT DRIVE HIGH SPEED OSCILLATING GRATING

[75] Inventor: Philip A. McGee, Beltsville, Md.

[73] Assignee: NIRSystems Incorporated, Silver Spring, Md.

[21] Appl. No.: 294,679

[22] Filed: Jan. 9, 1989

[51] Int. Cl.⁵ .............................. G01J 3/06; G01J 3/18
[52] U.S. Cl. .................................... 356/308; 356/328; 356/334
[58] Field of Search ................ 356/305, 308, 328, 334

[56] References Cited

U.S. PATENT DOCUMENTS

| | | | |
|---|---|---|---|
| 4,070,111 | 1/1978 | Harrick | 356/308 |
| 4,245,908 | 1/1981 | Gawlick | 356/328 |
| 4,264,205 | 4/1981 | Landa | 356/326 |
| 4,487,504 | 12/1984 | Goldsmith | 356/323 |
| 4,540,282 | 9/1985 | Landa et al. | 356/334 X |
| 4,766,551 | 8/1988 | Begley | 356/308 X |

Primary Examiner—Vincent P. McGraw
Attorney, Agent, or Firm—Lane, Aitken & McCann

[57] ABSTRACT

An optical grating is oscillated at a high rate to scan a narrow wavelength band of light through the spectrum dispersed by the grating. The grating is connected integrally with the rotor of a motor, which is energized to oscillate its rotor between selected limits. The direction of rotation of the motor is controlled by an H drive circuit connected to a coil of the motor. The speed of the motor is controlled by a pulse train applied to the motor coil through the H drive. The pulse train has a duty cycle varying inversely with the motor speed. The duty cycle of the pulse train is controlled by a counter which is connected to count high frequency pulses and which is reset each time the grating rotates through an angular increment. The limits of the oscillation of the grating and the rate of rotation of the grating between the limits are selectively variable. Output readings from the spectrophotometer are taken at equal angular increments of the grating and these readings are converted to values occurring at equal wavelength increments by a computer.

11 Claims, 3 Drawing Sheets

SPECTROMETER WITH DIRECT DRIVE HIGH SPEED OSCILLATING GRATING

BACKGROUND OF THE INVENTION

This invention relates to an optical instrument designed to analyze samples by means of narrow wavelength band light and more particularly to a system in which the narrow wavelength bands of light are generated by means of a spectrometer having a grating which oscillates at a high cyclical rate.

The general type of instrument of the present invention is disclosed in the Landa U.S. Pat. No. 4,264,205. As disclosed in this patent, an optical grating dispersing received light into a spectrum is oscillated at a high cyclical rate by conjugate cams. The conjugate cams not only achieve oscillation at a high cyclical rate, but also provide a rotation of the grating relative to the input drive axle to the cam mechanism that causes the grating to rotate through equal increments of wavelength for each equal angular increment of rotation of the input axle. Thus, by taking readings from the spectrometer at equal angular increments, readings from the sample are obtained at equal wavelength increments, for example, at two nanometer increments.

The above described instrument is an effective optical analyzing instrument, but it suffers from the disadvantage that the conjugate cams are an expensive mechanism and a long and relatively laborious procedure is required to properly adjust them when the instrument is being initially set up further adding to the cost of each instrument. In addition, there necessarily is some play or slop in the cam mechanism and, as a result, the measurements made by the instrument of the Landa patent are not precisely repeatable. This lack of repeatability becomes worse as the bearings in the mechanism began to wear with use of the instrument. In addition, the cam mechanism requires a large motor which adds substantially to the weight and size of the instrument. In addition, the cam mechanism generates a substantial amount of noise when the instrument is operating.

SUMMARY OF THE PRESENT INVENTION

The present invention overcomes all of the above described disadvantages of the above-described instrument by eliminating the cam mechanism. In accordance with the present invention, the motor axle is directly connected to the axle on which the grating is mounted. High speed oscillation is achieved by driving the motor with a pulse modulator having a duty cycle controlled by the motor speed. The direction that the motor is driven is controlled by the polarity of the pulse modulated signal applied to a winding of the motor. The grating is oscillated by the motor at a rapid speed between limits. Each time the grating reaches one of these limits, the polarity of the pulse drive to the winding is reversed and the control of the pulse modulation in accordance with the motor speed causes the motor to quickly accelerate to the desired angular speed of rotation after each reversal of angular speed at one of the limits. As a result, a high speed of oscillation is achieved with a substantially constant angular rate of rotation between the limits at which the grating is reversed. As in the instrument of the Landa patent, readings are taken over a multiplicity of cycles of the grating oscillation and are averaged. However, in the instrument of the present invention, instead of taking the readings at equal wavelength increments, the readings are taken at equal angular increments to obtain an average value for each equal angular increment. Corresponding values at equal wavelength increments are then determined by interpolating between the average values at equal angular increments.

Because the system does not employ a cam mechanism to oscillate the grating at a high speed, the disadvantages of the cam mechanism are avoided. In addition, because the speed control system accelerates the grating to the desired speed very quickly after each reversal of direction, a high rate of oscillation can be achieved while still maintaining the maximum angular rate of rotation of the grating sufficiently low to maintain satisfactory performance of the instrument.

DESCRIPTION OF A PREFERRED EMBODIMENT

Figure 1:
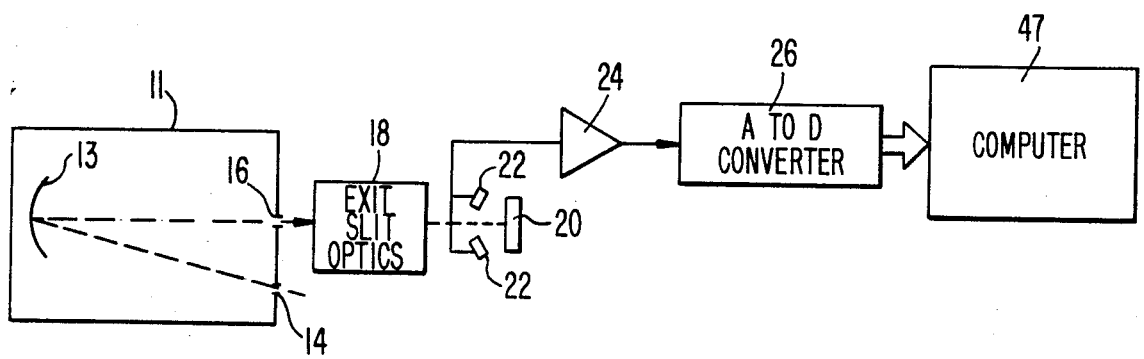
FIG. 1 schematically illustrates the instrument of the invention in which the system of the present invention is employed.

As shown in FIG. 1, the system of the invention comprises a spectrophotometer 11 similar to the spectrophotometer disclosed in the Landa U.S. Pat. No. 4,264,205, of which the system of the present invention is an improvement. The spectrophotometer 11 has an optical reflecting grating 13 mounted for oscillation within the spectrometer chamber. The grating 13 receives light through an entrance slit 14, reflects and disperses the received light into a spectrum extending over an exit slit 16, through which a narrow wavelength band of the spectrum passes. As the grating oscillates, the wavelength of the narrow band passing through the exit slit is scanned through the spectrum. The light passing through the exit slit 16 is received by exit slit optics 18 and directed onto a sample 20 to be analyzed. Light reflected from the sample 20 is detected by photodetectors 22 which generate an output signal corresponding to the intensity of reflection from the sample at the wavelength currently being transmitted through the exit slit. The photodetector output signal is amplified by amplifier 24, and successive samples of the amplifier output signal are converted to digital values by an analog-to-digital converter 26, which applies the digital values to a computer 47, in which the digital values are analyzed.

Figure 2:
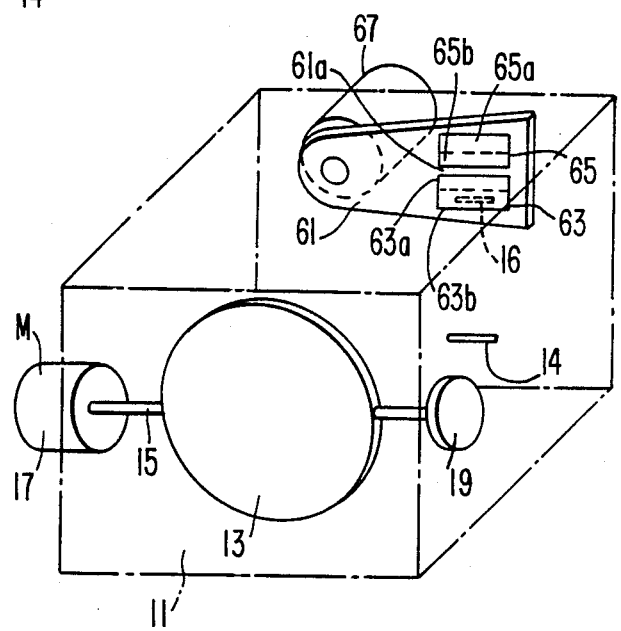
FIG. 2 is a perspective view of the spectrophotometer employed in the instrument of the invention.

As shown in FIG. 2, the optical reflecting grating 13 is mounted for oscillation within the spectrophotometer chamber on an axle 15 directly driven by a motor 17, which is energized to oscillate the grating at a high rate, preferably greater than 0.5 cycles per second and at a minimum no less than 0.1 cycles per second. The rotor of the motor 17, the axle 15 and the grating 13 are fixed together to oscillate as one piece. The motor 17 is designed specifically to generate an oscillating output and comprises a permanent magnet rotor driven by a single magnetic coil with the direction of rotation of the axle driven by the coil depending upon the direction of energization of the coil. Alternately, the motor 17 may be a conventional DC motor. An encoder 19 mounted on the axle 15 produces a dual channel output signal on two channels in the form of two rectangular wave forms, the relative phases of which depend upon the direction of rotation of the axle 15. The rectangular waveforms each have a 50 percent duty cycle.

Figure 3:
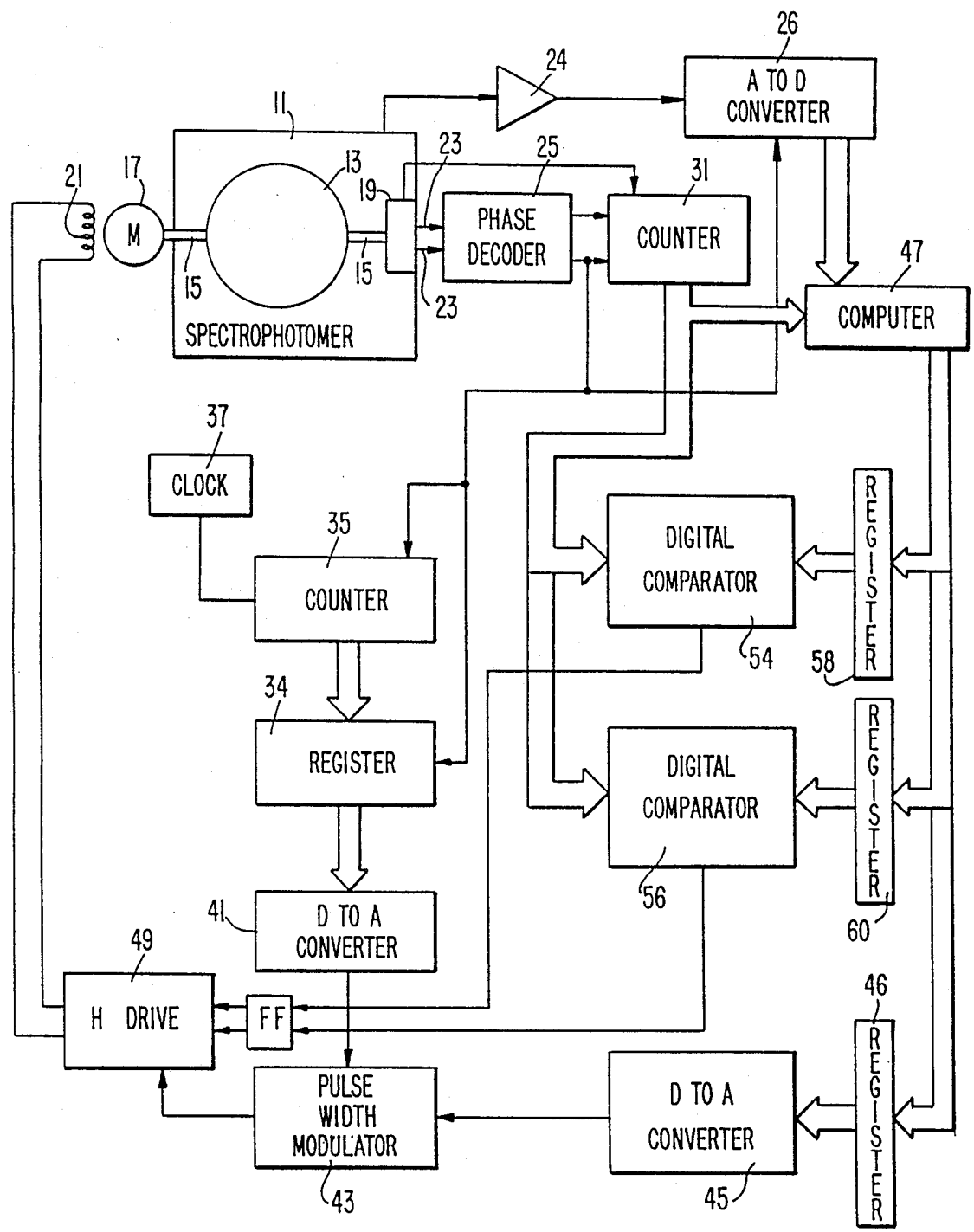
FIG. 3 is a block diagram illustrating the electronics employed in the system of the present invention to control the oscillating motor driving the grating of the spectrometer.

As shown in FIG. 3, the rectangular waveforms produced by the encoder 19 are applied over channels 23 to a phase decoder 25, which produces a train of narrow output pulses on an output channel 27 for each rise and fall time of each rectangular waveform on the two channels 23 The phase decoder produces a second output signal on channel 29 responsive to the relative phases of the signals on channels 23 and indicating the direction of rotation of the grating 13. The pulses on channel 27 and the signal on channel 29 are applied to a counter 31 which counts in one direction in response to pulses on channel 27 when the signal on channel 29 indicates rotation in one direction and counts in the opposite direction in response to pulses on channel 27 when the signal on channel 29 indicates rotation in the opposite direction. In addition, the encoder 19 produces an output pulse to reset the counter 31 to a reference value each time the axle 15 passes through a reference position. As a result, the count in the counter 31 will indicate the angular position of the grating 13. The output pulses produced on channel 27 are also applied to the reset input of a counter 35, which receives high frequency pulses from a clock pulse source 37. The counter 35 counts pulses from the clock pulse source 37, which produces pulses at a frequency at least an order of magnitude higher than the frequency of pulses received by the counter 35 from the phase decoder 25. The counter 35 is reset to zero each time it receives a pulse from the phase decoder 25 and then counts up to a count inversely proportional to the speed of rotation of the axle 15 at the time it is reset by the next pulse received from the phase decoder 25. Each time the counter 35 is reset, the count registered in the counter 35 is transferred to a register 39, which registers the count in response to the pulses on channel 27 from the phase decoder 25. Thus, the digital value in the register 39 will be a value varying inversely with the rotational speed of the axle 15 at the instant the counter 35 is reset and this value in the register 39 is updated at each incremental output from the encoder 19 as represented by the train of pulses on channel 27. The digital value in the register 39 is applied to a digital-to-analog converter 41 which produces an output analog signal voltage varying inversely with the angular speed of rotation of the axle 15 and applies this analog signal voltage to a pulse width modulator 43. The pulse width modulator 43 also receives an analog signal voltage from a digital-to-analog converter 45 representing a target speed for the axle 15 to be driven. The digital-to-analog converter 45 receives a digital signal from a register 46 representing the target speed and applies an analog signal corresponding to the received digital signal to the pulse width modulator 43. The register 46 is set to a value representing the target speed by the computer 47. The pulse width modulator 43 produces a train of output pulses having a duty cycle corresponding to the difference between the analog signal received from the digital-to-analog converter 45 and the analog signal received from the digital-to-analog converter 41 with the duty cycle varying directly with the output signal of the analog-to-digital converter 41. As the speed of the axle 15 increases causing a corresponding decrease at the output signal of the digital-to-analog converter 41, the duty cycle of the output pulse train produced by the pulse width modulator 43 will drop. As the speed of the axle 15 decreases resulting in a corresponding increase in the digital-to-analog converter 41 output, the duty cycle of the pulse train produced by the pulse width modulator 43 will increase. The pulse width modulator 43 is an off-the-shelf integrated circuit sold by Unitrode Integrated Circuits, 7 Continental Boulevard, Merrimack, New Hampshire, which describes the modulator as a "switch mode controller for DC motor drive" identified by the model No. UC 1637. The output Pulse train from the pulse width modulator 43 is applied through an H-drive circuit 49 to the coil 21 of the motor 17 and will control the motor torque in accordance with the duty cycle of the applied pulse train. The H-drive circuit 49 controls the direction, or polarity, that the pulse train is applied to the coil 22 and, thus, the direction in which the energization of the coil 21 causes the motor 17 to be driven. The H-drive 49 is controlled by a flip-flop 51 which in turn is controlled by the computer 47 and the counter 31 via digital comparators 54 and 56 and registers 58 and 60 The computer 47 sets digital values in the registers 58 and 60 representing the angular limits between which the grating 13 is to be oscillated by the motor 17. These digital values are in the same units and with the same angular reference point that the count in the counter 31 represents the angular position of the grating 13. The count registered in the counter 31 is applied to the digital comparators 54 and 56, which are connected to receive digital values from register 58 and 60, respectively. When the oscillating grating, while rotating clockwise between the limits of oscillation, reaches the limit represented by the value in register 58, the digital comparator 54 will detect this equality and apply a signal to the flip-flop 51 to cause it to switch to the state to cause rotation in the counterclockwise direction and thus cause the H-drive 49 to reverse the polarity of the pulse train applied to the coil 21. As a result, the H drive 49 will begin driving the motor 17 in the reverse direction. In a similar manner, when the oscillating grating, while rotating counterclockwise between the limits of oscillation, reaches the limit represented by the value in register 60, the digital comparator 56 will switch the flip-flop 51 to the state to cause rotation in the clockwise direction and thus reverse the direction of the motor 17. In this manner, the grating 13 is oscillated between limits determined by the computer 47. Simply by changing the values in registers 58 and 60, the limits of the oscillation, and thereby the portion of the spectrum scanned, can be varied.

When the grating 13 reverses direction, the speed of rotation of the axle 15 will go through zero speed and initially after the reversal of the direction of the grating 13, the low speed will be indicated by a corresponding high digital number in the register 39 and high analog signal applied to the pulse width modulator 43 by the digital-to-analog converter 41. As a result, the pulse width modulator 43 will initially energize the coil 21 with 100 percent duty cycle 43 to quickly accelerate the motor 17 toward the target value represented by the output signal of the digital-to-analog converter 45. At a 100 percent duty cycle, the output from the pulse width modulator is not a pulse train, but is continuous D.C. power. As the angular rotation of the grating 13 approaches the target value represented by the digital value stored in the register 46, the digital value in the register 39 will decrease and the pulse width modulator 43 in response to the two applied analog signals from the digital-to-analog converters 41 and 43 will reduce the duty cycle of the pulse train applied to the coil 21 of the motor 17 through the H drive 49. When the speed of the motor reaches the target value as represented by the digital value stored in the register 39, the pulse width modulator 43 in response to the two applied analog signal voltages will produce a pulse train with a duty cycle which is just large enough to overcome the friction and air resistance to which the grating 13 is subject and maintain the angular speed of rotation constant at the target value. In this manner, the speed of rotation of the grating 13 is quickly driven to the target speed each time the direction of rotation of the grating is reversed and then is rotated at a constant speed corresponding to the target value until the grating reaches the angular position at which it is to be reversed again, whereupon the cycle repeats. By changing the target speed value set in the register 46, the computer can vary the target speed and thus vary the rate of oscillation between 0.625 cycles per second and 2½ cycles per second. Slower cyclically rates of oscillation improve the resolution of the measurements but the maximum resolution is achieved at 0.625 cycles so there is no advantage in oscillating the grating below 0.625 cycles per second.

As shown in FIG. 2, a filter mounting plate 61 is pivotally mounted within the chamber of the spectrometer 11 adjacent t the exit slit 16. The filter mounting plate 61 mounts two filter plates 63 and 65, each filter plate 65 being divided into two filter segments 63a, 63b and 65a and 65b, respectively. The filter plate 61 is pivotable to five different positions by a stepping motor 67. In one position, the position shown in FIG. 2, the mounting plate 61 positions the filter segment 63b over the exit slit 16 so that the narrow band from the spectrum dispersed by the grating 13 passes through the filter segment 63b before passing through the exit slit 16. In a second position of the mounting plate 61, the filter segment 63a will be positioned over the slit 16. In a third position, the filter segment 65b will be positioned over the slit 16 and in a fourth position, the filter segment 65a will be positioned over the slit 16. In a fifth position, an opaque segment 61a of the mounting plate 61 will block the exit slit. In operation, when the sample being scanned with light extending over the near infrared range of 1100 nanometers to 2500 nanometers, only the filter segments 63a and 63b and the opaque segment 61a are used As the grating 13 oscillates scanning the spectrum passing through the exit slit 16 between 1100 nanometers and 2500 nanometers, the mounting plate 61 will initially remain in one position to position one of the filter segments 63a and 63b over the exit slit, and then part way through the spectrum, the stepping motor 67 will pivot the plate 61 to move the other one of the segments 63a and 63b in front of the exit slit. The filter segments 63a and 63b serve to eliminate the higher order dispersions from the light passing through the exit slit 116 so that only the first order dispersion passes through the exit slit. The reason that two filter segments are needed is that the second order dispersion is at one-half the wavelength of the first order dispersion so that, for example, when 2400 nanometers in the first order dispersion is being transmitted through the exit slit, light in the second order dispersion at 1200 nanometers will also be directed toward the exit slit. Thus, when the long wavelength end of the first order dispersion is passing through the exit slit, the mounting plate 61 will be positioned so that the segment 63a is in front of the exit slit. The filter segment 63a is designed to transmit light from the long wavelength end of the first order spectrum but not transmit light from the short wavelength end. When the grating 13 has oscillated to a position in which the short wavelength end of the first order spectrum is being transmitted through the exit slit 16, the stepping motor 67 will position the filter segment 63b in front of the exit slit 16 The filter segment 63b transmits light having wavelengths longer than 1100 nanometers so that the short wavelength end of the first order spectrum between 1100 and 2500 nanometers will be transmitted. The stepping motor 67 is controlled by the computer 47 which receives the digital output count of the counter 31 representing the angular position of the grating 13. Each time the grating passes through a point where the middle of the first order spectrum is passing through the exit slit 16, the computer 47 will step the stepping motor 67 to shift the position of the filter plate 61 so that the filter segment 63a is positioned in front of the exit slit 16 at the long wavelength end of the first order spectrum and the filter segment 63b is positioned over the exit slit 16 at the short wavelength end of the near order spectrum 16. In addition, the stepping motor 67 positions the opaque segment 61a over the exit slit at the end of each cycle of oscillation of the grating, at one of the limits of oscillation of the grating. At this time, the output signal of the amplifier 24 is converted to a digital value by the analog-to-digital converter and the digital value is received by the computer 47. This measurement, called the dark period measurement, provides a zero or null value to be subtracted from the measurements made is in response to narrow band light from the spectrum passing through the exit slit.

The system of the invention can also be used to make measurements in a shorter wavelength spectrum; that is, from 400 nanometers to 1100 nanometers. To make these measurements, the first order dispersion is employed and the filter segments 65a and 65b are also employed to filter out the higher order spectra in a manner similar to the way that the segments 63a and 63b operate in the first order spectrum from 1100 nanometers to 2500 nanometers.

The output signal of the photodetector 22 will represent the intensity of the reflection from the sample 20 at the wavelength currently illuminating the sample. This signal is amplified by amplifier 24 and converted to a digital value by an analog-to-digital converter 26 which receives pulses from the phase decoder 25. Each time the phase decoder 25 produces an output pulse on channel 27, the analog-to-digital converter converts the analog signal received from the photodetectors 22 to a digital value, which is applied to and received by the computer 47. Since the phase decoder produces output pulses at equal angular increments of the grating 13, the digital values representing the intensity of reflection from the sample are also received at equal angular increments of the grating. The computer 47 is programmed to average the values received at each angular increment over several scans of the spectrum, or, in other words, several oscillations of the grating 13. Following the averaging, the computer will have stored therein an average value of the intensity of reflection from the sample at each angular increment of the grating 13. The wavelength of the narrow band transmitted through the exit slit varies with the angular position of the grating 13 in accordance with the following formula:

$$\Lambda = K_1 \sin(\theta) + K_2 \cos\theta$$

wherein $\Lambda$ is the wavelength transmitted through the exit slit, $K_1$ and $K_2$ are constants which depend upon the design of the spectrophotometer and also vary somewhat from one unit to another, and $\theta$ is the angular position of the grating. The constants $K_1$ and $K_2$ are determined for each instrument by using standard samples having known peak reflectivities at particular wavelengths. From the angles where these peaks occur in the instrument, the constants $K_1$ and $K_2$ are determined by linear regression. These constants are then permanently stored in the memory of the computer 47. After the average for each angular increment of an unknown sample has been measured and stored in the computer 47, the computer then determines the intensity of the reflection from the sample at equal wavelength increments of two nanometers. This calculation is done by using the above formula to determine at what angles the two nanometer increments occur and interpolating between the values measured at each equal angular increment to determine a value for each two nanometer increment. The interpolated value for each two nanometer increment is determined from the following formula:

$$\frac{W_i - A_i}{A_{i+1} - A_i}(R_{i+1} - R_i) + R_i$$

in which $W_i$ is an angular position at which a two nanometer increment occurs, $A_i$ and $A_{i+1}$ are two adjacent angular positions at which reflectance measurements are made at equal angular increments and between which $W_i$ occurs, $R_i$ and $R_{i+1}$ are the average reflectance values determined for the angular positions $A_i$ and $A_{i+1}$.

Figure 4:
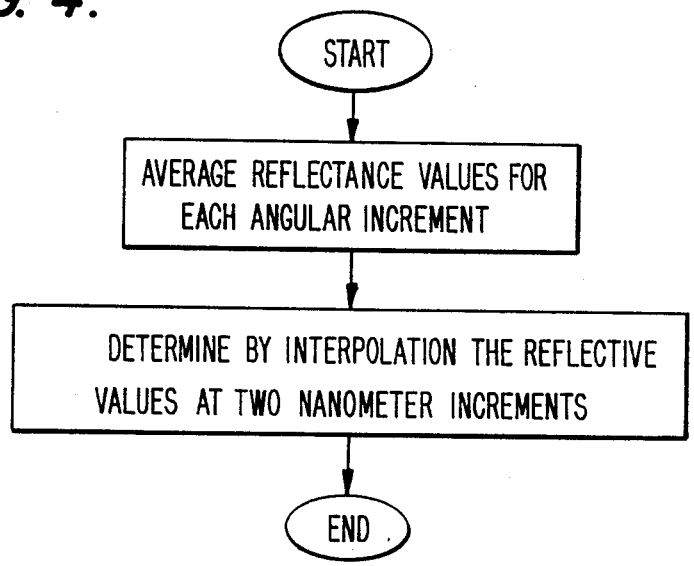
FIG. 4 is a flowchart showing a program employed in the computer of the system of the present invention to average and interpolate the reflectivity readings obtained by the spectrophotometer of the invention.

The flowchart of FIG. 4 illustrates the computer program employed in the computer 47 showing the sequential steps to first average the reflectance values over several cycles of oscillation followed by the interpolation step wherein the reflectance value at each two nanometer increment is determined.

Figure 5:
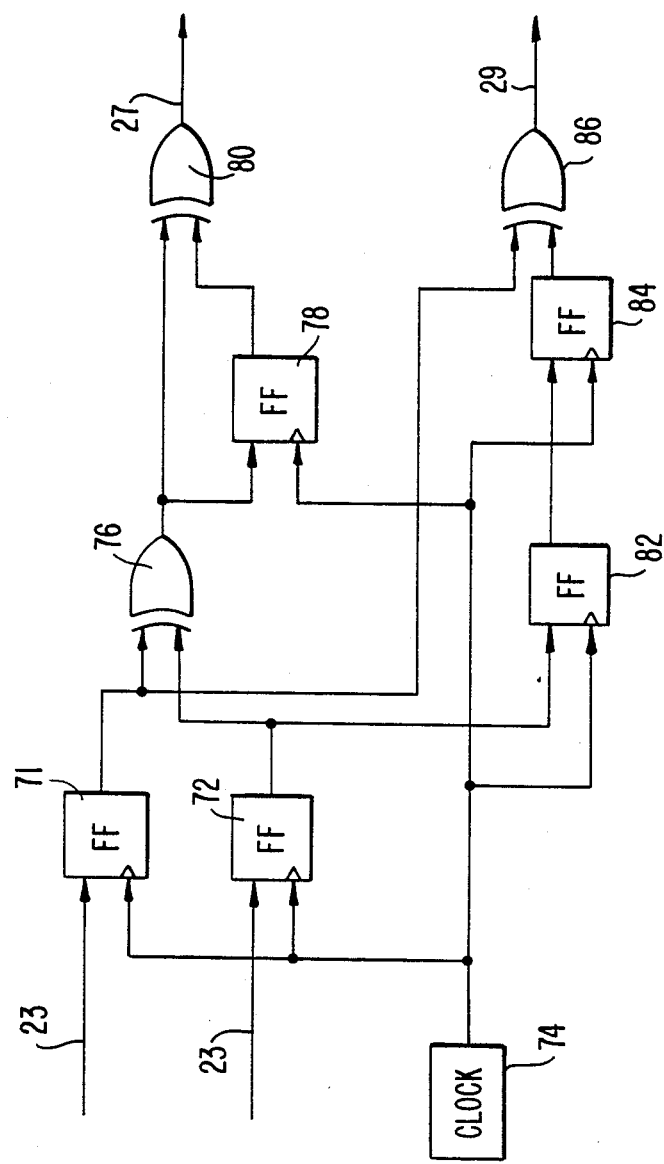
FIG. 5 is a block diagram of a phase discriminator employed in the motor control system shown in FIG. 4.

FIG. 5 is a block diagram illustrating the details of the phase decoder 25, which comprises two flip-flops 71 and 72 connected to receive the two square wave signals on channels 23 from the encoder 19. The flip-flops 71 and 72 are connected to be synchronized by a high frequency clock pulse signal from a clock pulse source 74 and operate to switch to the same state as the incoming square wave on one of the channels 23 whenever they also receive a clock pulse from the clock pulse source 72. As a result, the switchings of the flip-flops 71 and 72 to correspond with the incoming square waves on channels 23 are synchronized with the rise time of the clock pulses from the source 72. The output square waves from the flip-flops 71 and 72 are applied to an exclusive OR gate 76, which will produce a square wave train output at twice the frequency of the square waves on input channels 23 with rise and fall times corresponding to the rise and fall times of the waves on the two channels 23 as synchronized by the clock pulses from source 74. The output from the exclusive OR gate 76 is applied to a flip-flop 78, which also is synchronized by the output pulses from the clock pulse source 74 in the same manner as the flip-flops 71 and 72. As a result, the flip-flop 78 will produce a square wave output which is delayed by one clock pulse interval from the square wave output of the exclusive OR gate 76. The square wave output from the flip-flop 78 and the square wave output from the exclusive OR gate 76 are applied to an exclusive OR gate 80, which produces a train of output pulses having a pulse width corresponding to the width of the clock pulses from source 74 and occurring at each rise and fall time of the square wave output of the exclusive OR gate 76 or, in other words, corresponding to each rise and fall time of the square waves produced on channels 23 by the encoder 19. The output from the OR gate 80 is applied over channel 27 to the counter 35, the register 39, and the analog-to-digital converter 26.

The output from the flip-flop 72 is also applied to a flip-flop 82 which is synchronized by the clock pulses from the clock pulse source 74 in the same manner as the flip-flops 71 and 72. As a result, the flip-flop 82 will produce a square wave output corresponding to the output from the flip-flop 72 delayed by one clock pulse interval. This square wave is applied to a flip-flop 84 which is also synchronized by the clock 74 and operates in the same manner as the flip-flops 71 and 72. As a result, the flip-flop 84 produces an output which is delayed from the square wave output from flip-flop 72 by two clock periods. This square wave is applied to an exclusive OR gate 86 which also receives the square wave output from the flip-flop 71. As a result of these connections, the exclusive OR gate 86 will produce an output indicative of the relative phases of the signals applied on input channels 23 whenever the phase decoder produces a pulse on output channel 27, and, therefore, indicative of the direction of rotation of the grating 13. The output signal of the exclusive OR gate 86 is applied over channel 29 to the counter 31 to control the direction in which the counter 31 counts in response to each pulse produced on channel 27.

With the system as described above, the grating is oscillated at a high rate of speed. In this oscillation, the grating quickly reaches its maximum rate of speed after each reversal and then maintains a constant angular rate through the remainder of the cycle until the grating reaches the angular position where it is again reversed. This enables the grating to be driven between reversal positions as fast as permitted by the acquisition time of the computer and without causing excessive smearing of the bandwidth read out at each angular increment. Smearing is a phenomenon that occurs when the grating is rotated too fast. There is a tendency for the limits of the bandwidth being read out to shift as the angular speed of rotation of the grating increases thus adversely affecting the accuracy of the reflectivity data being obtained. By rapidly accelerating the grating to the desired speed and then maintaining the speed of rotation constant at the desired speed, the grating is caused to oscillate at the highest frequency possible consistent with avoiding unacceptable smearing and as permitted by the acquisition time of the computer 47.

The above described system is of a preferred embodiment of the invention and may be modified without departing from the spirit and scope of the invention, which is defined in the appended claims.

What is claimed is:

1. An optical instrument comprising an optical grating mounted for oscillating, means to illuminate said grating with light radiation to cause said radiation to disperse said radiation into a spectrum, means to receive a narrow bandwidth of the spectrum dispersed by said grating, a motor having its rotor fixed to said grating so that said rotor and said grating rotate as one piece, and motor control means to energize said motor to oscillate said rotor between limits to thereby oscillate said grating and scan the narrow wavelength band to be received by said receiving means through said spectrum, said motor control means energizing said motor with a first polarity of electrical energy to positively drive said motor in one direction between said limits in the oscillation of said motor and energizing said motor with a second polarity of electrical energization to positively drive said rotor in the opposite direction between said limits in said oscillation.

2. An optical instrument comprising an optical grating mounted for oscillating, means to illuminate said grating with light radiation to cause said radiation to disperse said radiation into a spectrum, means to receive a narrow bandwidth of the spectrum dispersed by said grating, a motor having its rotor fixed to said grating so that said rotor and said grating rotate as one piece, and motor control means to energize said motor to oscillate said rotor to thereby oscillate said grating and scan the narrow wavelength band to be received by said receiving means through said spectrum, said motor control means including means to indicate the angular position of said grating and means to reverse the direction of rotation of said motor in response to said position indicating means indicating an angular position at one of two preselected limits of the òscillation of said grating.

3. An optical instrument comprising an optical grating mounted for oscillating, means to illuminate said grating with light radiation to cause said radiation to disperse said radiation into a spectrum, means to receive a narrow bandwidth of the spectrum dispersed by said grating, a motor having its rotor fixed to said grating so that said rotor and said grating rotate as one piece, and motor control means to energize said motor to oscillate said rotor to thereby oscillate said grating and scan the narrow wavelength band to be received by said receiving means through said spectrum, said motor control means including speed control means to accelerate the motor speed quickly to a target speed each time the direction of rotation of said motor reverses at one of the limits of the motor oscillation and the maintain the speed of rotation of said motor at said target speed until the angular position of said grating reaches the other one of the limits of the motor oscillation.

4. An optical instrument as recited in claim 3 wherein said motor includes a coil arranged to torque said rotor in accordance with the energization of said coil and wherein said motor speed control means includes means to energize said coil with a pulse train having a duty cycle varying inversely with the speed of said motor.

5. An optical instrument as recited in claim 3 wherein said speed control means includes a counter connected to count high frequency clock pulses, means to reset said counter each time said grating rotates through an angular increment and means to control the speed of said motor between said limits in accordance with the count in said counter each time said counter is reset.

6. In an optical instrument having an optical grating mounted for oscillation, a motor coupled to said grating to oscillate the grating between limits, said motor having a coil arranged to torque said motor in accordance with the energization of said coil, the improvement comprising means to energize said coil with a pulse train having a duty cycle varying inversely with the speed of said motor between said limits.

7. In an optical instrument as recited in claim 6, wherein the duty cycle of said pulse train varies from a hundred percent at the limits of said oscillation to a minimum duty cycle just great enough to maintain the angular rate of rotation of said grating at a selected target speed.

8. An optical instrument as recited in claim 7, wherein said selected target speed is selectively variable.

9. An optical instrument as recited in claim 6, wherein said means to energize said motor includes a counter connected to count high frequency clock pulses, means to reset said counter each time said grating rotates through a predetermined angular increment, and mean to control said duty cycle in accordance with the count in said counter each time said counter is reset.

10. In an optical instrument having an optical grating mounted for oscillation, a motor coupled to said grating and means to energize said motor to oscillate said grating between limits, the improvement wherein said means to energize said motor includes motor speed control means to accelerate said motor quickly to a target value each time said motor reverses direction at one of said limits, said motor speed control means including a counter connected to count high frequency clock pulses, means to reset said counter each time said grating rotates through an angular increment, and means to control the speed of said motor between said limits in accordance with the count in said counter each time said counter is reset.

11. An optical instrument comprising an optical grating mounted for oscillation, means to illuminate said grating with light radiation to cause said grating to disperse said radiation into a spectrum, means to receive a narrow bandwidth of the spectrum dispersed by said grating, a motor having its rotor fixed to said grating so that said rotor and said grating rotate as one piece, a motor control means to oscillate said motor between limits to thereby oscillate said grating and scan the narrow wavelength band to be received by said receiving means through said spectrum, said motor control means energizing said motor by applying a sequence of pulses to said motor as said motor is driven in one direction between said limits to control the speed of said motor as it is driven between said limits.

* * * * *